United States Patent
Sinha

(10) Patent No.: US 7,852,091 B2
(45) Date of Patent: Dec. 14, 2010

(54) MICROWAVE DETERMINATION OF LOCATION AND SPEED OF AN OBJECT INSIDE A PIPE

(75) Inventor: Dipen N. Sinha, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 343 days.

(21) Appl. No.: 11/864,858

(22) Filed: Sep. 28, 2007

(65) Prior Publication Data

US 2009/0085582 A1    Apr. 2, 2009

(51) Int. Cl.
G01R 27/04    (2006.01)
G01R 27/32    (2006.01)

(52) U.S. Cl. ..................... 324/637; 324/644
(58) Field of Classification Search .......... 324/637, 324/644
See application file for complete search history.

(56) References Cited

U.S. PATENT DOCUMENTS

| | | | | |
|---|---|---|---|---|
| 4,167,736 A | | 9/1979 | Tomlinson | |
| 4,820,970 A | * | 4/1989 | Swanson | 324/640 |
| 5,315,880 A | * | 5/1994 | Bailey | 73/861.25 |
| 6,008,657 A | * | 12/1999 | Suyama et al. | 324/639 |
| 6,759,968 B2 | * | 7/2004 | Zierolf | 340/854.8 |
| 6,854,336 B2 | * | 2/2005 | Buttle | 73/779 |
| 2002/0101373 A1 | | 8/2002 | Arndt et al. | |
| 2003/0066358 A1 | | 4/2003 | King | |
| 2005/0001169 A1 | | 1/2005 | Happel | |
| 2006/0028369 A1 | | 2/2006 | Rausch et al. | |
| 2006/0279450 A1 | | 12/2006 | Annan et al. | |

OTHER PUBLICATIONS

Hong Hua et al., "A Low-Cost Dynamic Range-Finding Device Base on Amplitude-Modulated Continuous Ultrasonic Wave," IEEE Transactions on Instrumentation and Measurement, vol. 51, No. 2, Apr. 2002, pp. 362-367.
International Search Report for PCT/US08/11194, International Searching Authority, Dec. 18, 2008, p. 1-9.

* cited by examiner

*Primary Examiner*—Jeff Natalini
(74) *Attorney, Agent, or Firm*—Cochran Freund & Young LLC; Meredith H. Schoenfeld

(57) ABSTRACT

Apparatus and method are described for measuring the location and speed of an object, such as instrumentation on a movable platform, disposed within a pipe, using continuous-wave, amplitude-modulated microwave radiation.

14 Claims, 2 Drawing Sheets

MICROWAVE DETERMINATION OF LOCATION AND SPEED OF AN OBJECT INSIDE A PIPE

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to apparatus and method for determining the location of movable objects, instrumentation for example, inside pipes and, more particularly, to the use of continuous microwave radiation for determining the location and speed of an object within a pipe.

BACKGROUND OF THE INVENTION

Natural gas pipeline operators typically send instrumented platforms called 'pigs' through the pipelines in order to monitor the structural integrity thereof. The cost for such procedures can be as much as $1 M for each 100 miles of inspected pipe. The position and velocity of the pig at all times must be known so that pipe observations may be accurately correlated with location information. Presently, odometers are utilized for this purpose; however, these devices are inaccurate because of slipping, and recalibration against markers in the pipe such as weld joints at approximately every 30 m must be made. For differences greater than 30 m, the odometer has insufficient accuracy. Another approach is to use a sonde device where a low-frequency electromagnetic wave (~500 Hz) penetrates the pipe and can be detected a few meters above the ground. Observers present at designated locations receive the sonde signal as the pig passes nearby through the pipe. The location is then marked using GPS, but the accuracy of the measurement is a few meters. Moreover, for the method to work the pipe cannot be buried too deep in the ground. Because of these inaccuracies, if a defect is located, a significant length of pipe must be uncovered in order to locate the defect identified by the pig. This may be time-consuming, expensive and inconvenient especially if the pipe is located beneath a busy city thoroughfare or under a river, as examples.

Microwave radiation having, for example, a frequency of 10.5 GHz (X-Band) has a smaller wavelength (3 cm) than the diameter of a typical gas pipeline; that is, greater than 6 cm in diameter, is known to propagate inside metal pipes without significant attenuation, the pipe behaving as a waveguide for such radiation. Higher microwave frequencies may be employed for pipes having smaller diameters, but higher attenuation at these higher frequencies may reduce the range of transmission at these wavelengths. Microwave radiation has also been observed to readily travel through bends in pipes.

In "A Low-Cost Dynamic Range-Finding Device Base on Amplitude-Modulated Continuous Ultrasonic Wave" by Hong Hua et al., IEEE Trans. Instr. and Meas. 51, 362 (2002), a discussion is provided for the ultrasonic determination of distance longer than the wavelength of a high frequency carrier wave using a low frequency amplitude modulated signal.

SUMMARY OF THE INVENTION

It is an object of the present invention to provide an apparatus and method for locating a fixed or moving object inside of a pipe.

Another object of the invention is to provide an apparatus and method for locating a fixed or moving object inside of a pipe, and for measuring its speed of travel.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus for measuring the speed of an object located in a pipe having a wall, hereof, includes: a transmitting antenna disposed inside the pipe for transmitting microwave radiation; means in electrical communication with the transmitting antenna for generating microwave radiation having a chosen wavelength; a receiving antenna disposed inside the pipe in the vicinity of the transmitting antenna for receiving microwave radiation reflected from the object and generating an electrical signal therefrom; and means for receiving the electrical signal and for measuring a Doppler shift between the transmitted microwave radiation and the received microwave radiation resulting from motion of the object in the pipe; whereby the speed of the object is obtained.

In another aspect of the present invention and in accordance with its objects and purposes, the method for measuring the speed of an object located in a pipe, hereof, includes the steps of: transmitting microwave radiation having a chosen wavelength from a chosen location inside the pipe in the direction of the object in the vicinity of the chosen location; receiving the microwave radiation reflected from the object and generating an electrical signal therefrom; and receiving the electrical signal and measuring a Doppler shift between the transmitted microwave radiation and the received microwave radiation resulting from motion of the object in the pipe; whereby speed information for the object is obtained.

In yet another aspect of the present invention and in accordance with its objects and purposes, the apparatus for determining the location of an object within a pipe having a wall, hereof, includes in combination: a transmitting antenna disposed inside the pipe for transmitting microwave radiation; means in electrical communication with the transmitting antenna for generating microwave radiation having a first chosen wavelength; a receiving antenna disposed inside the pipe in the vicinity of the transmitting antenna for receiving microwave radiation reflected from the object and for generating an electrical signal therefrom; means for generating a second chosen wavelength of electromagnetic radiation; means for amplitude modulating the first chosen wavelength of microwave radiation at the second chosen wavelength; means for demodulating the electrical signal; means for measuring the phase difference between the second chosen wavelength and the demodulated electrical signal, whereby at least one standing wave is generated between the first antenna and the object when the second chosen wavelength is chosen to make the phase difference zero; and means for determining the second chosen wavelength, whereby the distance between the object and the transmitting antenna is obtained.

In a further aspect of the present invention and in accordance with its objects and purposes, the method for determining the location of an object within a pipe, hereof, includes the steps of: generating microwave radiation having a first chosen wavelength; generating electromagnetic radiation having a second chosen wavelength; amplitude modulating the first chosen wavelength of microwave radiation at the second chosen wavelength; transmitting the amplitude modulated microwave radiation from a chosen location within the pipe; in the vicinity of the chosen location, receiving microwave radiation reflected from the object and generating an electrical signal therefrom; demodulating the electrical signal; measuring the phase difference between the second chosen wavelength and the demodulated electrical signal; changing the wavelength of the second chosen wavelength until the phase difference is zero, whereby at least one standing wave is generated between the chosen location and the object; and determining the second chosen wavelength, whereby the distance between the object and the chosen location is obtained.

In another aspect of the present invention and in accordance with its objects and purposes, the apparatus for determining the location and speed of an object within a pipe having a wall, hereof, includes in combination: a transmitting antenna disposed inside the pipe for transmitting microwave radiation; means in electrical communication with the transmitting antenna for generating microwave radiation having a first chosen wavelength; a receiving antenna disposed inside the pipe in the vicinity of the transmitting antenna for receiving microwave radiation reflected from the object and generating an electrical signal therefrom; means for generating electromagnetic radiation having a second chosen wavelength; means for amplitude modulating the first chosen wavelength of microwave radiation at the second chosen wavelength; means for demodulating the electrical signal; means for measuring the phase difference between the second chosen wavelength and the demodulated electrical signal, whereby at least one standing wave is generated between the first antenna and the object when the second chosen wavelength is chosen to make the phase difference zero; means for determining the second chosen wavelength, whereby the distance between the object and the receiving antenna is obtained; and means for receiving the electrical signal corresponding to the first chosen wavelength and for measuring a Doppler shift between the transmitted microwave radiation having the first chosen wavelength and the received microwave radiation resulting from motion of the object in the pipe, whereby the speed of the object is obtained.

In yet another aspect of the present invention and in accordance with its objects and purposes, the method for determining the location and speed of an object within a pipe, hereof, includes the steps of: generating microwave radiation having a first chosen wavelength; generating electromagnetic radiation having a second chosen wavelength; amplitude modulating the first chosen wavelength of microwave radiation at the second chosen wavelength; transmitting the amplitude modulated microwave radiation from a chosen location within the pipe; in the vicinity of the chosen location, receiving microwave radiation reflected from the object and generating an electrical signal therefrom; demodulating the electrical signal; measuring the phase difference between the second chosen wavelength and the demodulated electrical signal; changing the wavelength of the second chosen wavelength until the phase difference is zero, whereby at least one standing wave is generated between the chosen location and the object; determining the second chosen wavelength, whereby the distance between the object and the chosen location is obtained; and receiving the electrical signal corresponding to the first chosen wavelength and measuring a Doppler shift between the transmitted microwave radiation having the first chosen wavelength and the received microwave radiation resulting from motion of the object in the pipe; whereby the speed of the object is obtained.

Benefits and advantages of the present invention include, but are not limited to, providing apparatus and method for accurately and simultaneously determining the location and speed of an object disposed within a pipe.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
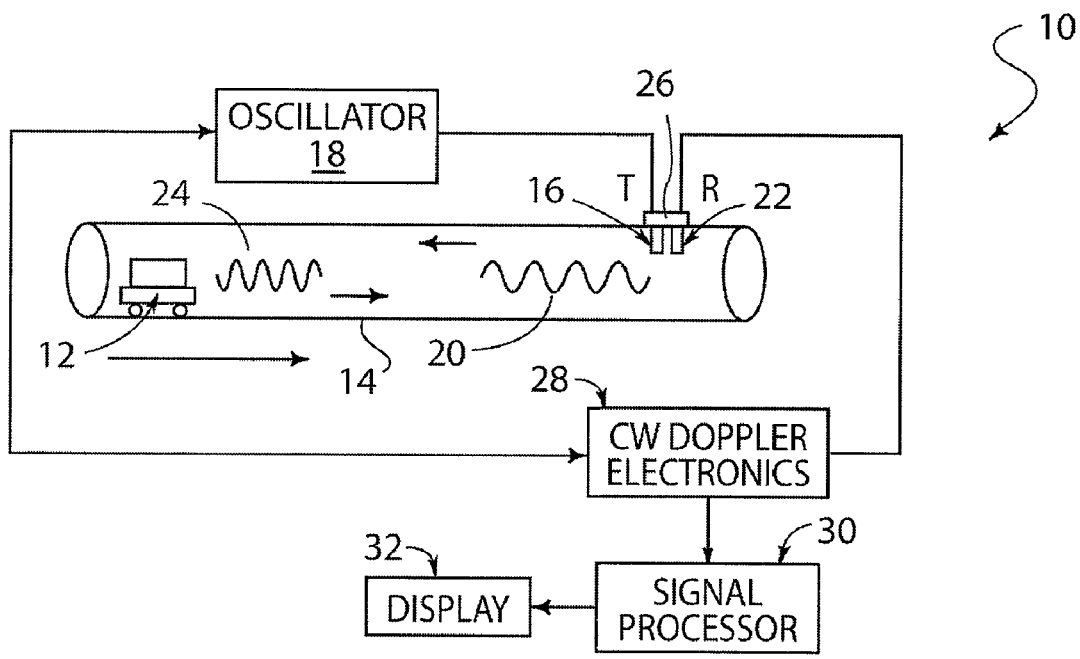
FIG. 1 is a schematic representation of an embodiment of the apparatus of the present invention for measuring the speed of an object disposed within a pipe using the continuous-wave microwave Doppler shift.

Briefly, the present invention includes apparatus and method for measuring the distance and speed of an object such as a movable instrumentation package, as an example, disposed on a movable platform within a pipe using continuous-wave (CW), amplitude-modulated (AM) microwave radiation. The useful range depends on the electrical conductivity of the pipe (skin depth); however, most natural gas pipelines are made from steel and this provides for low attenuation microwave propagation.

For measurement of speed of an object, such as a pig, inside of a pipe, two antennas may be used, a first antenna operating as a transmitter and the second antenna as a receiver. Pairs of antennas are placed close together to avoid having to account for additional phase differences due to their separations. The antennas may be placed inside the pipe through a pressure-sealed connector at distance intervals required by the pipe inspection, for example, a few kilometers apart or less depending on the transmission range. In their simplest form, the antennas are pieces of wire about a quarter-wavelength of the carrier frequency in length. As it travels through the pipe, the pig reflects the signal from the transmitting antenna, the reflected signal being detected by the receiving antenna and processed using commercially available electronic apparatus suitable for measuring a Doppler shift. From such measurements object speed information may be derived and displayed. Such systems also permit computer interfacing for remote monitoring of data. It should also be mentioned that if the initial position of the pig is known, the speed information can be used to determine its current location in the pipe.

For accurate measurements of the location of an object within a pipe, the phase shift of a signal reflected from the object being located is used as opposed to the transmitted signal. Since the wavelength at 10.5 GHz is approximately 3 cm, the phase shifts 360° for each 3 cm traveled, thereby providing little useful information. However, if the microwave signal is amplitude modulated at lower frequency having a corresponding wavelength of hundreds of meters, then the envelope of the signal can be used for the phase shift measurement. Starting with lower frequencies would require large antenna structures which cannot physically be placed into the pipes and such lower frequencies would not propagate through a metal pipe because of the cut-off wavelength. The antenna size for an AM modulated signal is related to the high-frequency carrier wave and not the low-frequency modulating signal. If an AM signal is introduced into a pipe at one location and measured at a certain distance therefrom, the envelope of the signal will be phase shifted, but the phase shift will reach 360° over the entire wavelength of the low-frequency modulating signal.

The modulating signal frequency is adjusted such that it sets up a standing wave between the receiving antenna and the pig, and this frequency is maintained by use of an automatic feedback circuit. A stable (low drift) microwave oscillator at 10.5 GHz generates the carrier signal, while a voltage controlled oscillator (VCO) generates the AM signal. The output of the VCO and the carrier signal are multiplied to obtain the AM signal that is used to drive the transmitter. The reflected signal is detected by the receiver antenna and the output amplified and demodulated to recover the AM signal which is the low-frequency sine-wave signal envelope of the AM signal.

Stability may be improved by having the modulating signal tracked automatically. In another embodiment of the invention, the demodulated signal may be compared with the VCO output in a phase detector circuit and the VCO frequency automatically adjusted automatically to make the phase shift output of the phase detector 0°. It can also be locked at 90° phase shift. The phase locking ensures that there is always a standing wave (a fixed number of half-wavelengths of the low-frequency modulating signal) between the pig (reflector) and the antenna. The direct measurement of the VCO frequency (therefore, its wavelength) determines the desired distance.

That is, a microwave oscillator may be used to generate an amplitude-modulated (AM) microwave signal using a lower frequency signal generated from a voltage controlled oscillator (VCO), this AM signal being directed to the transmitter antenna. The signal then propagates through the pipe and reflects back to the transmitter where the receiver antenna generates a signal. Following amplification, this return signal is demodulated to obtain the modulating signal and the resulting low-frequency demodulated signal is compared with the original VCO signal to obtain a phase-difference signal that is used to adjust the VCO signal to maintain a fixed phase difference such that a standing wave of the low-frequency signal is established between the transmitter and the object. As the object moves, the frequency is automatically adjusted such that the standing wave remains, although its wavelength changes accordingly.

Another embodiment of the invention includes moving from the one standing-wave mode to another in order to obtain improved accuracy, if needed. That is, it may be more convenient to use higher modes, 10 standing waves, as an example, instead of using the fundamental mode and making the standing wave a kilometer long, since the higher frequency waves are more readily phase locked. The VCO frequency can be set close to that required for a desired mode, the frequency then automatically locking to the desired frequency and remaining at that frequency. This can be done digitally through a microprocessor-controller if a DDS (direct digital synthesizer) is used as the VCO. An adjustable center-frequency band-pass filter may be installed in the circuit path to restrict the frequency within certain limits. Since the speed of light and the frequency of the VCO output are known, the wavelength (or half wavelength) can be readily calculated. The feedback circuit maintains this standing wave. When the distance to be measured is small, one can adjust the standing wave to a fundamental mode and then move to a higher mode at larger distances.

The output of the VCO is directly related to the distance between the pig and the transmitting antenna because it is a measure of the frequency of the wavelength that produces a standing wave. If this frequency is known, the wavelength is known and one-half of this wavelength is the distance sought, since the fundamental frequency of the standing wave is half of one wavelength. For a 0.001 degree phase resolution, theoretical distance resolution is about 3 mm over a distance of 1 km.

It should be pointed out that the CW Doppler measurement circuitry can be operated in simultaneously with the amplitude modulated circuitry to make simultaneous speed measurements. The carrier wave is Doppler shifted due to the movement of the pig. However this frequency shift is small, in the kHz range, and does not affect the AM measurement. Therefore, both circuits can operate simultaneously without any interference between them, and both distance and speed measurements can either be displayed in real time on a display unit or digitized for remote monitoring through a computer. The circuitry employed is commercially available and the measurement approach can be used for other situations where other types of waves are used. There can be many such applications where the position and speed of an object inside a confined space need to be determined, although the present invention is sufficiently general to be used without the need for a confining structure.

Reference will now be made in detail to the present embodiments of the invention, examples of which are illustrated in the accompanying drawings. In the FIGURES, similar structure will be identified using identical reference characters. Turning now to FIG. 1, a schematic representation of an embodiment of apparatus, 10, for measuring the velocity of object, 12, a pig, as an example, in pipe, 14, includes transmitting antenna (T), 16, driven by oscillator, 18, for launching a CW microwave signal, 20, into pipe, 14, toward pig 12, and receiving antenna (R), 22, for receiving a reflected wave, 24, therefrom. It should be pointed out that microwaves generally reflect well from small objects; therefore, no reflectors are expected to be necessary on the pigs. Pairs of antennas 16 and 22 may be introduced into pipe 14 through pressure-sealed connector, 26, at distance intervals required by the pipe inspection, for example, a few kilometers apart. In their simplest embodiment, antennas 16 and 22 may be closely-spaced lengths of wire a quarter-wavelength of the carrier frequency in length. Close spacing avoids the necessity of phase corrections resulting from greater antenna separation. The signal 24 received by receiving antenna 22 is directed to commercial Doppler electronics apparatus, 28, suitable for measuring a Doppler shift (low kilohertz) between the wave generated by oscillator 18 and reflected wave 20 reaching antenna 26. The resulting Doppler frequency shift information, is directed to signal processor, 30, for deriving object speed information, and displayed using display apparatus, 32. Such systems also permit computer interfacing for remote monitoring of data.

The speed determined by the Doppler shift is expressed by the following equation:

$$v = c\left(\frac{f_D - f_0}{f_D + f_0}\right),$$

where v is the speed of the moving object, c is the speed of light, $f_D$ is the Doppler shifted frequency and $f_0$ is the microwave carrier frequency. This equation can be approximated as:

$$v = 2.86 \times \Delta f \text{ (Hz)},$$

in cm/s, for a 10.5 GHz microwave source and $\Delta f$ is the Doppler shifted frequency ($f_D$-$f_0$). The X-band (10.5 GHz) frequency is used only for convenience, and other frequencies may be chosen based, for example, on the pipe diameter.

Figure 2:
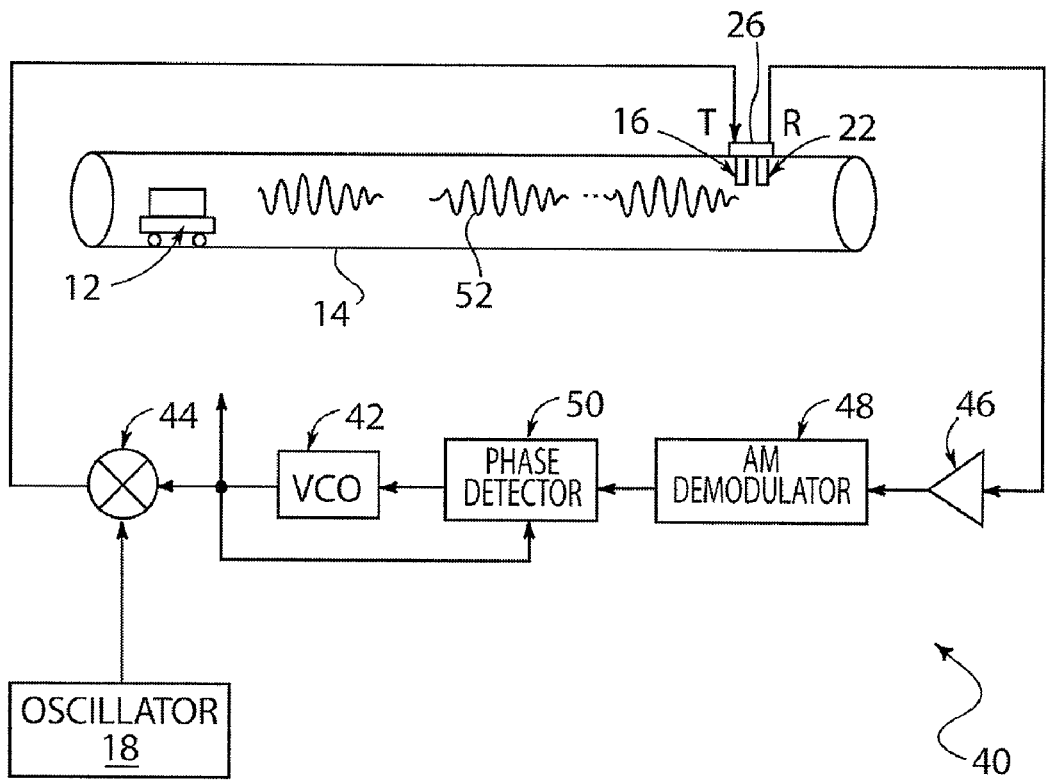
FIG. 2 is a schematic representation of an embodiment of the apparatus of the present invention for determining the location of an object disposed within a pipe using amplitude-modulated, continuous-wave microwave radiation.

FIG. 2 shows an embodiment of an apparatus, 40, for accurate location measurements of object (for example, a pig) 12 within pipe 14, the phase shift of a signal reflected from the object being located is used as opposed to the transmitted signal. Pairs of antennas 16 and 22 may be introduced into pipe 14 through pressure-sealed connector, 26, at distance intervals required by the pipe inspection, for example, a few kilometers apart. The output from voltage-controlled oscillator (VCO), 42, and a carrier signal generated by oscillator 18 are multiplied in mixer, 44, to produce an AM signal for driving transmitting antenna 16. This modulating signal frequency is adjusted such that it sets up a standing wave between receiving antenna 22 and pig 12. The reflected signal is detected by receiving antenna 22, and the output thereof is amplified by amplifier, 46, and demodulated using AM demodulator, 48, to recover the AM signal which is the low-frequency sine-wave signal envelope of the AM signal. The modulating signal is phase shifted as a result of the modulated carrier wave having traversed the pipe. By comparing the demodulated signal with the output from the VCO, using phase detector, 50, the frequency output from the VCO is automatically adjusted to make the phase shift zero degrees or ninety degrees. This phase locking ensures that there is always a standing wave (a fixed number of half-wavelengths of the low-frequency modulating signal), 52, between pig 12 and antenna 16.

The output frequency from the VCO is directly related to the distance between pig 12 and receiving antenna 22 since it is a measure of the frequency of the wavelength that produces a standing wave. If this frequency is known, the wavelength is known and one-half the wavelength is the distance (the fundamental frequency of the standing wave is half of one wavelength) between pig 12 and receiving antenna 22.

Figure 3:
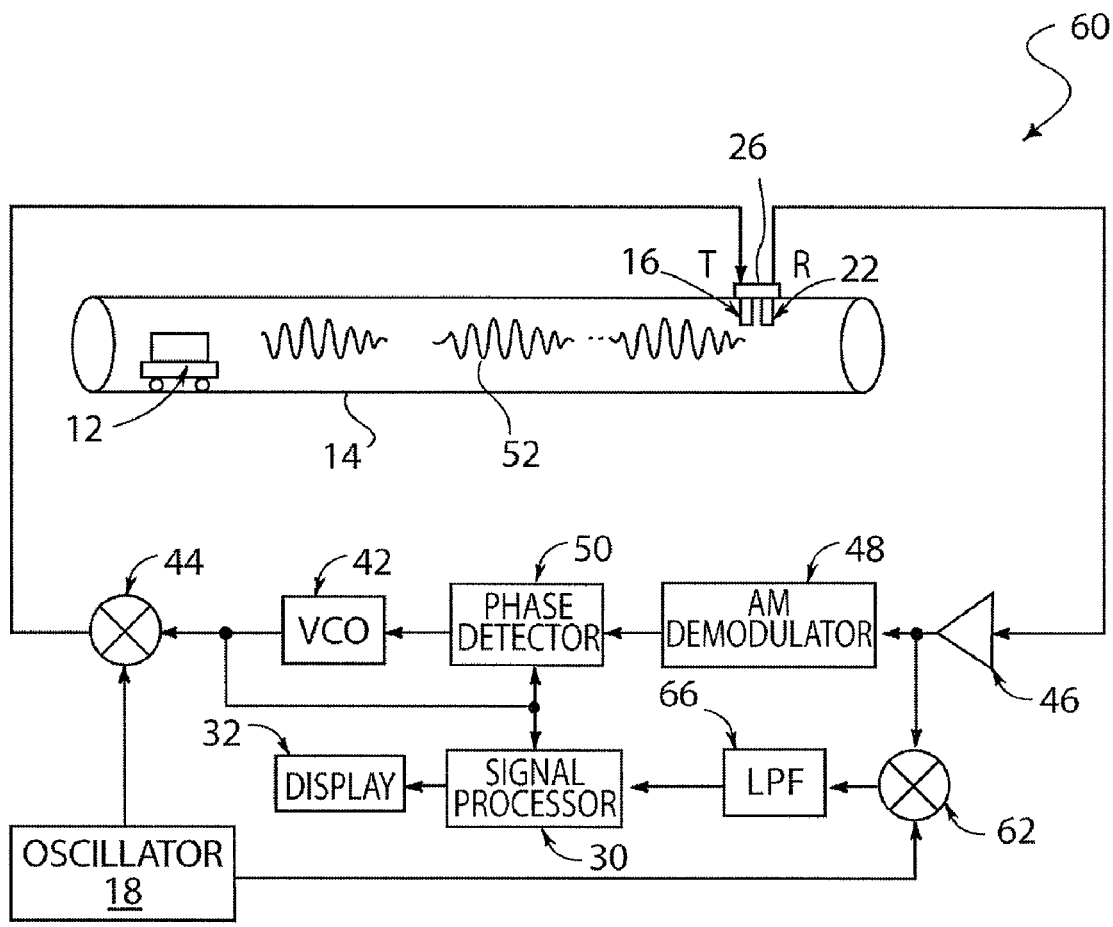
FIG. 3 is a schematic representation of an embodiment of the apparatus of the present invention for simultaneously measuring the speed and determining the location of an object disposed within a pipe using continuous-wave microwave radiation.

FIG. 3 shows an embodiment of an apparatus, 60, for simultaneous measurement of distance and velocity, wherein the signal received from receiving antenna 22 is amplified by amplifier, 46, and directed to frequency mixer, 62. The output of stable 10.5 GHz oscillator 18 is also directed to mixer 62. The resulting signal contains both the carrier frequency of 10.5 GHz and two sidebands that correspond to the amplitude-modulated signal frequency, and is close in frequency to the carrier signal since for a 3 km length, a 10 MHz modulation signal provides a suitable wavelength. Therefore, the side bands are only 10 MHz shifted on either side of the carrier frequency. After mixing, the low-frequency Doppler frequency is obtained, and after low-pass filtering using low-pass filter, 66, having a cutoff frequency of less than about 5 kHz, the effect of the sidebands is removed. The resulting Doppler signal representing the velocity of object (the pig, for example) 12 is directed to signal processor (microcontroller) 30 for conversion of the Doppler frequency to a speed value. The output of VCO 42 has the distance information and this is also directed to the same signal processor for conversion to distance. As in FIG. 2 hereof, the VCO output is the modulating frequency that generates standing waves inside pipe 14 and thus the wavelength corresponding to this frequency has the distance information. The output of signal processor 30 may be displayed on display unit 32 or communicated to a distant location for remote monitoring.

It should be pointed out that apparatus and method of the present invention are quite universal, and may be used for other situations and in other frequency regions. For example, the present invention was used at ultrasound frequencies for monitoring the liquid level inside of a tank from the bottom of the tank. The carrier frequency was chosen to match the thickness mode resonance of the tank wall (at the bottom), thereby providing maximum transmission of sound through this wall. Noninvasive, continuous, accurate liquid levels (distance from the tank bottom) could be obtained in this manner.

Further, Doppler measurements were made in a 100 foot long, 4 in. diameter steel pipe using commercial apparatus.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for simultaneously measuring the speed and determining the location of an object located in a pipe having a wall, comprising in combination:
   a transmitting antenna disposed inside said pipe for transmitting microwave radiation;
   means in electrical communication with said transmitting antenna for generating microwave radiation having a chosen wavelength;
   a receiving antenna disposed inside said pipe in the vicinity of said transmitting antenna for receiving microwave radiation reflected from said object and generating an electrical signal therefrom; and
   means for receiving the electrical signal and for measuring a Doppler shift between the transmitted microwave radiation and the received microwave radiation resulting from motion of said object in said pipe, whereby the speed and location of said object is obtained simultaneously.

2. The apparatus of claim 1, further comprising a pressure-sealed connector for permitting said transmitting antenna to receive microwave radiation from said means for generating microwave radiation, and said means for measuring Doppler shift to receive the signal from said receiving antenna through the wall of said pipe.

3. The apparatus of claim 1, wherein the wavelength of the transmitted radiation is smaller than the diameter of said pipe.

4. Apparatus for determining the location of an object within a pipe having a wall, comprising in combination:
   a transmitting antenna disposed inside said pipe for transmitting microwave radiation;
   means in electrical communication with said transmitting antenna for generating microwave radiation having a first chosen wavelength;
   a receiving antenna disposed inside said pipe in the vicinity of the transmitting antenna for receiving microwave radiation reflected from said object and for generating an electrical signal therefrom;

means for generating a second chosen wavelength of electromagnetic radiation;

means for amplitude modulating the first chosen wavelength of microwave radiation at the second chosen wavelength;

means for demodulating the electrical signal;

means for measuring the phase difference between the second chosen wavelength and the demodulated electrical signal, whereby at least one standing wave is generated between said first antenna and said object when the second chosen wavelength is chosen to make the phase difference zero; and means for determining the second chosen wavelength, whereby the distance between said object and said transmitting antenna is obtained.

5. The apparatus of claim 4, further comprising a pressure-sealed connector for permitting said transmitting antenna to receive microwave radiation from said means for generating microwave radiation, and said means for measuring the second chosen wavelength to receive the signal from said receiving antenna through the wall of said pipe.

6. The apparatus of claim 4, wherein the wavelength of the transmitted radiation is smaller than the diameter of said pipe.

7. The apparatus of claim 4, further comprising means for receiving the electrical signal corresponding to the first chosen wavelength and for measuring a Doppler shift between the transmitted microwave radiation having the first chosen wavelength and the received microwave radiation resulting from motion of said object in said pipe, whereby the speed of said object is obtained.

8. A method for determining the location of an object within a pipe, comprising the steps of:

generating microwave radiation having a first chosen wavelength;

generating electromagnetic radiation having a second chosen wavelength;

amplitude modulating the first chosen wavelength of microwave radiation at the second chosen wavelength;

transmitting the amplitude modulated microwave radiation from a chosen location within the pipe;

in the vicinity of the chosen location, receiving microwave radiation reflected from the object and generating an electrical signal therefrom;

demodulating the electrical signal;

measuring the phase difference between the second chosen wavelength and the demodulated electrical signal;

changing the wavelength of the second chosen wavelength until the phase difference is zero, whereby at least one standing wave is generated between the chosen location and the object; and determining the second chosen wavelength, whereby the distance between the object and the chosen location is obtained.

9. The method of claim 8, wherein the first chosen wavelength is smaller than the diameter of the pipe.

10. Apparatus for determining the location and speed of an object within a pipe having a wall, comprising in combination:

a transmitting antenna disposed inside said pipe for transmitting microwave radiation;

means in electrical communication with said transmitting antenna for generating microwave radiation having a first chosen wavelength;

a receiving antenna disposed inside said pipe in the vicinity of said transmitting antenna for receiving microwave radiation reflected from said object and generating an electrical signal therefrom;

means for generating electromagnetic radiation having a second chosen wavelength;

means for amplitude modulating the first chosen wavelength of microwave radiation at the second chosen wavelength;

means for demodulating the electrical signal;

means for measuring the phase difference between the second chosen wavelength and the demodulated electrical signal, whereby at least one standing wave is generated between said first antenna and said object when the second chosen wavelength is chosen to make the phase difference zero;

means for determining the second chosen wavelength, whereby the distance between said object and said receiving antenna is obtained; and means for receiving the electrical signal corresponding to the first chosen wavelength and for measuring a Doppler shift between the transmitted microwave radiation having the first chosen wavelength and the received microwave radiation resulting from motion of said object in said pipe, whereby the speed of said object is obtained.

11. The apparatus of claim 10, further comprising a pressure-sealed connector for permitting said transmitting antenna to receive microwave radiation from said means for generating microwave radiation, and said means for measuring the second chosen wavelength to receive the signal from said receiving antenna through the wall of said pipe.

12. The apparatus of claim 10, wherein the wavelength of the transmitted radiation is smaller than the diameter of said pipe.

13. A method for determining the location and speed of an object within a pipe, comprising the steps of:

generating microwave radiation having a first chosen wavelength wherein the pipe behaves as a waveguide for the microwave radiation;

generating electromagnetic radiation having a second chosen wavelength;

amplitude modulating the first chosen wavelength of microwave radiation at the second chosen wavelength;

transmitting the amplitude modulated microwave radiation from a chosen location within the pipe;

in the vicinity of the chosen location, receiving microwave radiation reflected from the object and generating an electrical signal therefrom;

demodulating the electrical signal;

measuring the phase difference between the second chosen wavelength and the demodulated electrical signal;

changing the wavelength of the second chosen wavelength until the phase difference is zero, whereby at least one standing wave is generated between the chosen location and the object;

determining the second chosen wavelength, whereby the distance between the object and the chosen location is obtained; and receiving the electrical signal corresponding to the first chosen wavelength and measuring a Doppler shift between the transmitted microwave radiation having the first chosen wavelength and the received microwave radiation resulting from motion of the object in the pipe; whereby the speed of the object is obtained.

14. The method of claim 13, wherein the first chosen wavelength is smaller than the diameter of the pipe.

* * * * *